US011305773B1

(12) United States Patent
Semenov et al.

(10) Patent No.: US 11,305,773 B1
(45) Date of Patent: Apr. 19, 2022

(54) POWERTRAIN TO FRICTION BRAKE STANDSTILL HANDOFF FOR ONE PEDAL DRIVE

(71) Applicant: Ford Global Technologies, LLC, Dearborn, MI (US)

(72) Inventors: Sergey Gennadievich Semenov, Farmington Hills, MI (US); Bryan Michael Bolger, Canton, MI (US); Angel Fernando Porras, Dearborn, MI (US); Devin James O'Donnell, Detroit, MI (US); Dale Scott Crombez, Livonia, MI (US); Alexander McCollough, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 24 days.

(21) Appl. No.: 17/035,468

(22) Filed: Sep. 28, 2020

(51) Int. Cl.
*B60W 30/18* (2012.01)
*B60W 10/08* (2006.01)
(Continued)

(52) U.S. Cl.
CPC ......... *B60W 30/18127* (2013.01); *B60L 7/26* (2013.01); *B60T 7/042* (2013.01); *B60T 8/3215* (2013.01); *B60W 10/08* (2013.01); *B60W 10/184* (2013.01); *B60W 10/196* (2013.01); *B60L 2240/12* (2013.01); *B60L 2240/26* (2013.01); *B60L 2240/642* (2013.01); *B60L 2250/28* (2013.01); *B60T 2210/20* (2013.01); *B60T 2220/04* (2013.01); *B60T 2250/02* (2013.01); *B60T 2250/04* (2013.01); *B60T 2270/604* (2013.01); *B60T 2270/82* (2013.01);
(Continued)

(58) Field of Classification Search
CPC .. B60W 10/08; B60W 10/184; B60W 10/188; B60W 10/192; B60W 10/196; B60W 30/18109; B60W 30/18127; B60W 30/181; B60W 2552/15; B60W 2520/10; B60W 2530/10; B60W 2540/10; B60W 2710/083; B60W 2710/18; B60L 7/26; B60L 2240/12; B60L 2240/26; B60L 2240/642; B60L 2250/28; B60T 7/042; B60T 8/3215; B60T 2210/20; B60T 2220/04; B60T 2250/02; B60T 2250/04; B60T 2270/604; B60T 2270/82; B60T 2270/89

See application file for complete search history.

(56) References Cited

U.S. PATENT DOCUMENTS 7,908,067 B2  3/2011  Soliman et al.
8,061,464 B2  11/2011  Boesch
(Continued)

FOREIGN PATENT DOCUMENTS

CN  103386966 A  11/2013

Primary Examiner — Edwin A Young
(74) Attorney, Agent, or Firm — David B. Kelley; Brooks Kushman P.C.

(57) ABSTRACT

A method for controlling a vehicle includes monitoring the vehicle speed for a first threshold in conjunction with a driver request for negative torque, after which the method comprises increasing a friction braking ratio. The method further comprises monitoring the speed of the vehicle for a second threshold, wherein the second threshold is lower than the first, after which the method comprises solely using the friction braking for braking holding torque.

17 Claims, 5 Drawing Sheets

(51) Int. Cl.
  *B60W 10/184* (2012.01)
  *B60W 10/196* (2012.01)
  *B60T 7/04* (2006.01)
  *B60T 8/32* (2006.01)
  *B60L 7/26* (2006.01)

(52) U.S. Cl.
  CPC ...... *B60T 2270/89* (2013.01); *B60W 2520/10* (2013.01); *B60W 2530/10* (2013.01); *B60W 2540/10* (2013.01); *B60W 2552/15* (2020.02); *B60W 2710/083* (2013.01); *B60W 2710/18* (2013.01)

(56) References Cited

U.S. PATENT DOCUMENTS

| | | | |
|---|---|---|---|
| 8,596,390 B2 | 12/2013 | Soliman et al. | |
| 2014/0149010 A1* | 5/2014 | Li | B60L 15/2045 701/70 |
| 2016/0185327 A1* | 6/2016 | Ishida | B60W 10/188 701/74 |
| 2018/0065629 A1* | 3/2018 | Wolff | B60L 7/12 |
| 2018/0141557 A1* | 5/2018 | Nefcy | B60W 20/30 |

* cited by examiner

POWERTRAIN TO FRICTION BRAKE STANDSTILL HANDOFF FOR ONE PEDAL DRIVE

TECHNICAL FIELD

This disclosure relates to braking a vehicle.

BACKGROUND

One pedal drive is a feature that gives more control to the accelerator pedal with increased lift pedal regenerative braking and the ability to bring the vehicle to a stop without input from the brake pedal on a range of grades. Once the vehicle has been brought to a complete stop, it may not be desirable for the low speed controller to use powertrain torque commands to hold the vehicle because the traction motor can experience increases in temperature when holding the vehicle at a standstill. It may be challenging for the low speed controller to keep the vehicle at standstill due to noise in the calculated vehicle speed resulting from a noisy motor speed and driveline lash near zero torque.

SUMMARY

One Pedal Drive may be enabled responsive to driver input. A selected button or vehicle speed being below some threshold for example may enable this mode of operation. The One Pedal Drive Low Speed Controller may send a request to the Brake Control Module for friction brakes to hold the vehicle at a standstill. The Brake Control Module ramps up application of a calibrated amount of friction brake pressure to hold the vehicle still on any grade that the Low Speed Controller is able to bring the vehicle to a stop. The Low Speed Controller may be responsible for determining that the vehicle has come to a complete stop before sending the request to the brake controller. If the Low Speed Controller has requested the Brake Control Module to bring the vehicle to a stop instead of commanding the vehicle to a stop using powertrain torque, the Low Speed Controller can transition its request to the Brake Control Module from a request to stop to a request for standstill friction brakes when it has confirmed that the vehicle is at standstill. Once the standstill brake request has been sent, the Low Speed Controller may reduce powertrain torque depending on how much friction torque is delivered. To drive away in One Pedal Drive, as the customer presses the accelerator pedal, the Low Speed Controller may wait to see that enough powertrain torque is built up to move the vehicle to keep it from rolling backward and then remove the standstill friction brake request.

One embodiment may comprise a vehicle. The vehicle may comprise an electric machine, a friction brake, and a controller. The electric machine may regeneratively brake the vehicle based on driver accelerator input. The controller may apply the friction brakes to apply a friction holding torque value to the vehicle responsive to a speed of the vehicle achieving or being less than a speed threshold. For example, the speed threshold may be 0 mph. The speed threshold may be dependent on road grade or weight of the vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A vehicle may use an electric power source for propulsion. For example, the vehicle may include a traction battery used for propulsion of the vehicle. Additionally, the vehicle may be partially propelled by an internal combustion power source such as an internal combustion engine. In embodiments containing both electrical and internal combustion power sources, the internal combustion power source may be in electrical communication with the electrical power source, such that power generated by the internal combustion power source may be used to charge the electrical power source. In such embodiments, the internal combustion power source may use electrical power components to facilitate conversion of combustion power to electrical power. For example, the internal combustion power source may be in mechanical communication with a generator. The generator may be in electrical communication with the electrical power source. In this configuration, the internal combustion power source may use combustion to operate the generator, thus charging the electrical power source. The vehicle may comprise other electrical power components. For example, the vehicle may comprise an additional electrical machine. The electrical machine may be configured to add negative torque to the vehicle during operation.

The vehicle may have an accelerator pedal. The accelerator pedal may be configured to control vehicle propulsion. To facilitate control of propulsion, the accelerator pedal may be configured such that pressing the pedal may request positive torque from a power source within the vehicle causing the vehicle to increase speed. Additionally, the accelerator pedal may be configured such that releasing the pedal may request negative torque with respect to the direction of vehicle motion, thus causing the vehicle to decrease in speed. Input from the accelerator pedal may be used to request negative torque from an electric machine, an electric power source, an internal combustion engine, regenerative braking, friction braking, and other sources of negative torque.

The vehicle may comprise a regenerative braking system. The regenerative braking system may be disposed within the wheels of the vehicle. The regenerative braking system may be in one of electromagnetic and mechanical communication with the wheels. In embodiments wherein the regenerative braking system is in electromagnetic communication with one of the drivetrain and the wheels, the regenerative braking system may use magnetic resistance to provide negative torque to the wheels, such that the vehicle speed may be decreased by the regenerative braking system. Additionally, the regenerative braking system may use energy collected from the inertia of the vehicle to generate electrical power. Further, the regenerative braking system may be in electrical communication with an electrical power source and configured to provide electrical power to the electrical power source. For example, the regenerative braking system may be used to charge a vehicle battery. The regenerative braking system may include electrical power components to facilitate the transfer of inertial energy into electrical power configured for the electrical power source. For example, the regenerative braking system may use a generator to convert inertia into electrical power.

The vehicle may comprise a friction braking system. The friction braking system may be disposed within the wheels of the vehicle. The friction braking system may be selectively in physical communication with the wheels such that in a first friction braking position, the friction braking system may provide a first friction coefficient to the wheels, and in a second friction braking position, provide a second friction coefficient to the wheels. The first friction coefficient may be zero. The second friction braking coefficient may work to provide negative torque to the wheels with respect to motion of the vehicle.

The vehicle may have a drivetrain. The drivetrain may be in at least one of electrical, magnetic, and mechanical communication with at least one of an internal combustion engine, an electric power source, and a regenerative braking system. In some embodiments, the drivetrain may be in fluid communication with the internal combustion engine. For example, the vehicle may have a torque converter between the drivetrain and the internal combustion engine.

The vehicle may have a propulsion braking system. The propulsion braking system may be in mechanical communication with the drivetrain. Hence, the propulsion braking system may be in one of electrical, magnetic, mechanical, and fluid communication with at least one of the internal combustion engine, electric power source, and regenerative braking system. While the vehicle is traveling. As such, the propulsion braking system may receive inertial resistance from one of the internal combustion engine, electric power source, and regenerative braking system.

The vehicle may have a road grade sensor. The road grade sensor may be configured to determine the incline grade of the road. The road grade sensor may determine the slope of a present road. In turn, the road grade sensor may be able to determine the grade of the vehicle. The grade of the vehicle may affect lateral gravitational forces. Lateral forces may act to move a vehicle forward or backward. For example, if a vehicle is on surface with a grade of 0%, the vehicle may experience a value of 0% of its total weight in lateral forces. Alternatively, if a vehicle is on a surface with a grade of 10%, the vehicle may experience a value of approximately 10% of its total weight in lateral forces. If a vehicle is not under the influence of braking torque opposing the lateral gravitation forces, the vehicle may move in response to the lateral forces.

The vehicle may have a controller. The controller may be in electrical communication with at least one of the regenerative braking system, the friction braking system, the electrical power source, the mechanical power source, the drivetrain, and the accelerator pedal. As such, the controller may be able to control operations of these devices. For example, the controller may be able to actuate the friction braking system. Similarly, the controller may be able to actuate the regenerative braking system. Further, the controller may be configured to operate an electrical machine capable of providing negative torque to the vehicle.

The controller may comprise a timer. The timer may be used to determine the amount of time a vehicle is at or below a second speed threshold. For example, the controller may use the timer to observe that a vehicle has been at 0 mph (standstill) for at least 10 seconds. The controller may comprise a temporal value schedule. The temporal value schedule may be dependent upon the grade of the road. For example, the temporal value schedule may have a value of 10 seconds for a grade of 2%, while having a value of 5 seconds for a grade of 8%. The temporal value schedule may be dependent upon the weight of the vehicle. For example, the temporal value schedule may have a value of 10 seconds for a vehicle of a first weight, while having a value of 5 seconds for a vehicle of a second weight.

The controller may comprise a brake ramp schedule. The brake ramp schedule may be used to determine the rate of torque application and release from the friction brake. Similarly, the brake ramp schedule may be used to determine the rate of torque application and release from other braking sources. The brake ramp schedule may be dependent upon road grade. For roads of steeper grades, the brake ramp schedule may apply and release the friction brakes faster during actuation than on flat roads. The is due to the varying lateral forces received from steeper slopes. Similarly, the brake ramp schedule may be dependent upon vehicle weight. Vehicles of greater weight may produce stronger lateral forces depending on road grade. As such, the brake ramp schedule may apply friction braking faster for heavier vehicles.

The controller may be configured to actuate the friction brake, actuate the regenerative braking system, and operate the electrical machine in accordance with a first execution method. The first execution method may comprise monitoring the velocity of the vehicle. Upon the driver requesting negative torque by reducing force on the accelerator pedal and the vehicle decreasing in velocity to a first speed threshold, the controller may determine the grade of the road. Alternatively, the controller may continuously monitor the grade of the road. The controller may begin to actuate the friction braking system to provide negative torque to decrease the velocity. Additionally, the controller may begin to decrease negative torque provided by the regenerative braking system. Further, the controller may decrease operation of the electrical machine configured to provide negative torque to the vehicle. Next, the controller may monitor the driver's continuous request for negative torque and the vehicle decreasing in velocity to a second speed threshold. Some embodiments further consider a temporal value for the vehicle being equal to or less than the second speed threshold. Upon reaching the second speed threshold, the controller may completely release the regenerative braking system, and cease operation of the electrical machine configured to provide negative torque to the vehicle. As such, all negative torque provided by the vehicle will be produced by the friction braking system under said conditions. The rate of friction braking application, regenerative braking release, and electrical machine operation cessation may be dependent upon the braking ramp schedule. In some embodiments, the controller may determine the torque required to hold the vehicle based at standstill on at least one of on the current road grade and the vehicle weight. Alternatively, the vehicle may determine the holding torque by monitoring the amount of torque applied by the friction braking system at standstill. While the vehicle is at standstill, and the driver requests positive torque via the accelerator pedal, the controller may increase the torque provided by the a power source of the vehicle to the drivetrain such that it is equal or greater than the required holding torque of the vehicle at standstill. Upon the power source applying positive torque equal to or greater than the value of the brake holding torque, the vehicle may begin to release the friction braking system. Still, the holding torque may be calculated by the grade of the road. The holding torque value may be independent of friction braking and non-friction braking. As such, the controller may calculate the holding torque required to hold the vehicle, and supply the holding value by at least one of or a combination of the friction braking and the non-friction braking.

Figure 1:
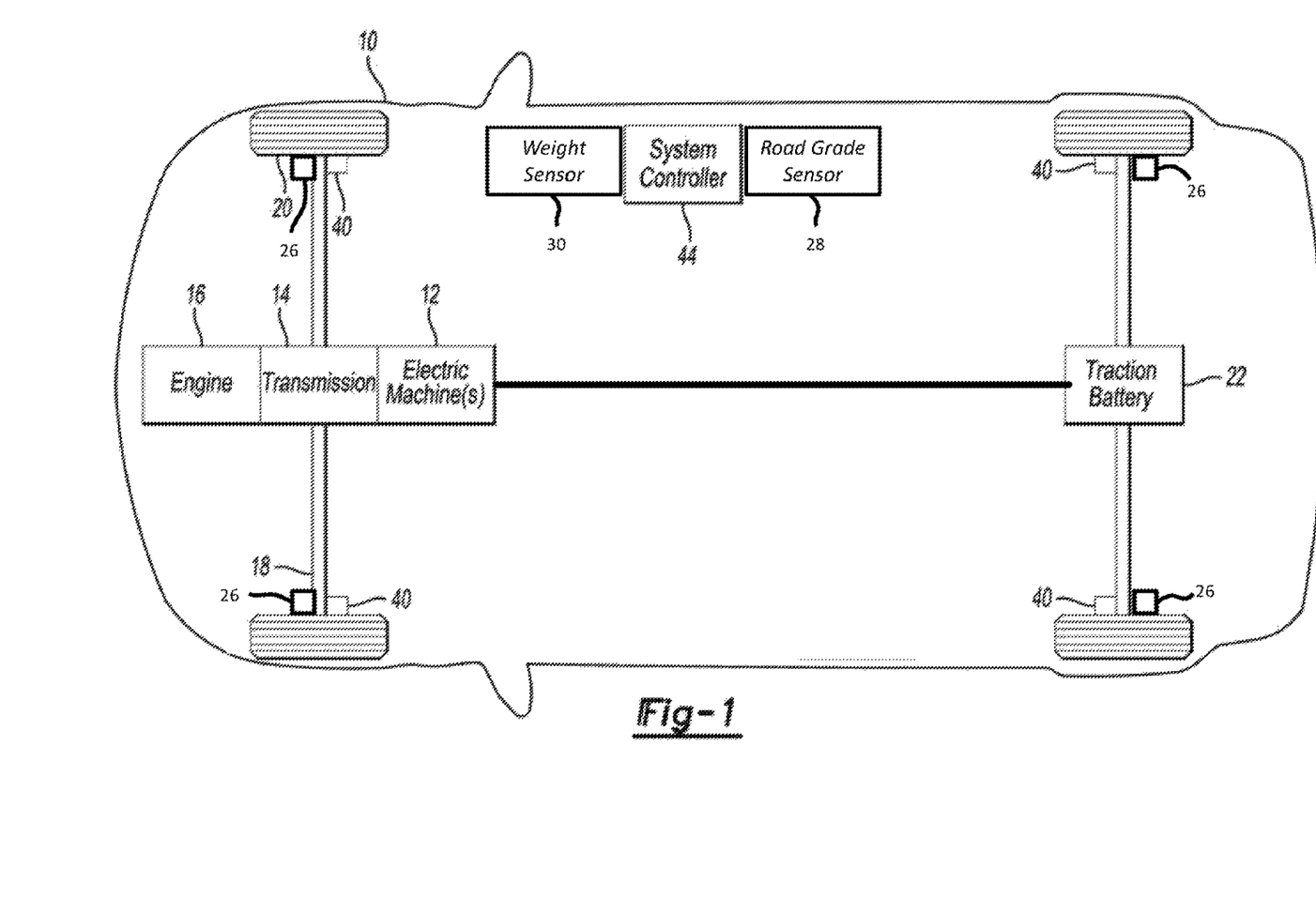
FIG. 1 illustrates a vehicle.

With reference to FIG. 1, electrified vehicle 10 may include one or more electric machines 12 mechanically coupled to a gearbox or hybrid transmission 14. The electric machines 12 may operate as a motor and a generator. In addition, the hybrid transmission 14 is mechanically coupled to an engine 16. The hybrid transmission 14 is also mechanically coupled to a drive shaft 18 that is mechanically coupled to wheels 20. The electric machines 12 can provide propulsion and regenerative braking capability when the engine 16 is on or off, and allow the vehicle 10 to be operated in electric mode with the engine 16 off under certain conditions. The vehicle 10, in other arrangements, may lack the engine 16 (e.g., a battery electric vehicle). Other architectures are also contemplated.

A battery pack or traction battery 22 stores energy that can be used by the electric machines 12. The traction battery 22 may provide a high voltage direct current (DC) output. In addition to providing energy for propulsion, the traction battery 22 may provide energy for other vehicle electrical systems.

Wheel brakes 24 may be provided for braking and preventing motion of the vehicle 10. The wheel brakes 24 may be hydraulically actuated, electrically actuated, or some combination thereof. The wheel brakes 24 may be a part of a brake system 26. The brake system 26 may include other components to operate the wheel brakes 24. For simplicity, FIG. 1 depicts a single connection between the brake system 26 and one of the wheel brakes 24. A connection between the brake system 26 and the other wheel brakes 24 is implied. The brake system 26 may include a controller to monitor and coordinate its activities. The brake system 26 may monitor the brake components and control the wheel brakes 24. The brake system 26 may respond to driver commands and may also operate autonomously to implement features such as stability control. The controller of the brake system 26 may implement a method of applying a requested brake force when requested by another controller or sub-function.

The vehicle 10 may further comprise a road grade sensor 28 and a weight sensor 30. The road grade sensor 28 may be configured to determine the slope of a present road and communicate the grade value to a controller 32. Similarly, the weight sensor 30 may be configured to determine the weight of the present vehicle and communicate the weight of the present vehicle to the controller 30. The controller 44 (vehicle system controller) may further coordinate operation of the various components, and execute or cause the algorithms described below to be executed by another controller.

Electronic modules in the vehicle 10 may communicate via one or more vehicle networks. The vehicle networks may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE)802 family of standards. Additional channels of the vehicle network may include discrete connections between modules and may include power signals from an auxiliary battery. Different signals may be transferred over different channels of the vehicle network. For example, video signals may be transferred over a high speed channel (e.g., Ethernet) while control signals may be transferred over CAN or discrete signals. The vehicle network may include any hardware and software components that aid in transferring signals and data between modules. The vehicle network is not shown in FIG. 1, but it may be implied that the vehicle network may connect to any electronic modules that are present in the vehicle 10.

Figure 2:
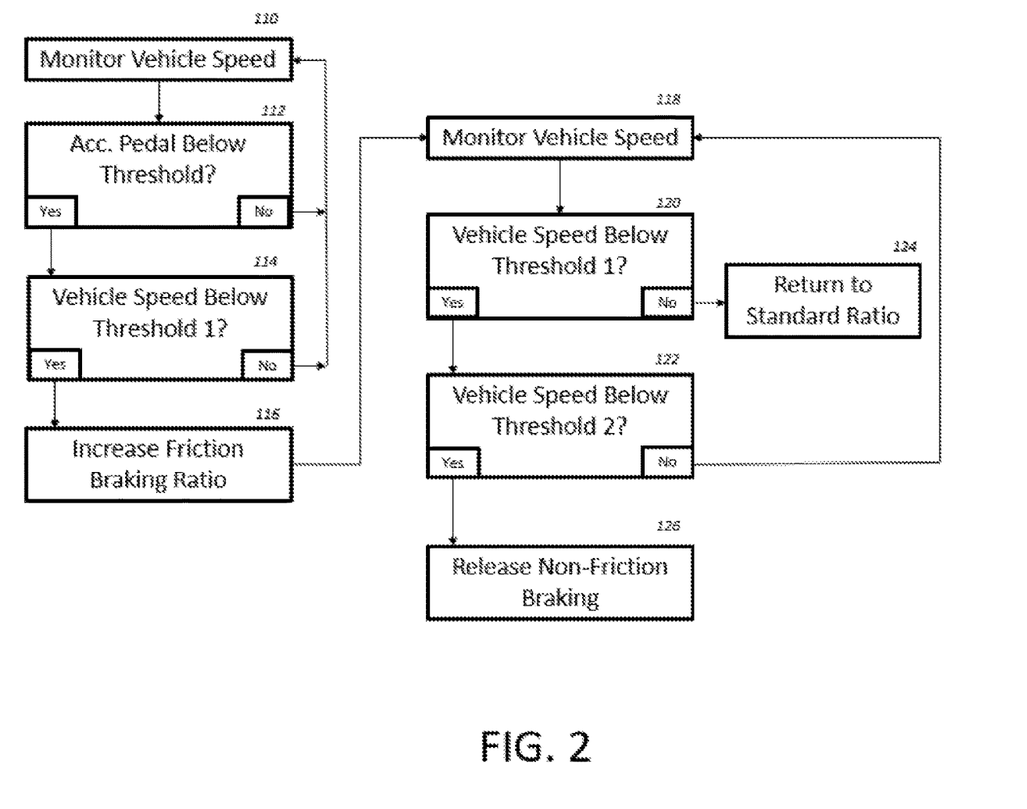
FIG. 2 illustrates a first braking execution algorithm.

With reference to FIG. 2, first braking execution method 101 comprises a first initial speed monitoring step 110. The method further comprises monitoring for an accelerator pedal threshold 112. If an accelerator pedal reaches a predetermined pedal threshold, the method comprises a speed threshold 1 comparison step 114. In the speed threshold 1 comparison step 114, the controller compares the present speed of the vehicle to a first threshold speed. Upon both the request for negative torque and the vehicle speed being below a first threshold, the method comprises implementing an increased friction braking ratio strategy in an increase friction braking ratio step 116. In the increase friction braking ratio step 116, the controller may increase the ratio of friction braking in comparison to other sources of negative torque, such as regenerative braking and propulsion braking from electric machines. The ratio may vary in accordance with a brake ramp schedule dependent upon the grade of the road and the weight of the vehicle stored within the controller 44. The method further comprises an intermediate speed monitor step 118 for monitoring the vehicle speed. Next the method comprises comparing the vehicles present speed to the first speed threshold in a second speed threshold 1 comparison step 120. If the vehicle speed is not below the first threshold, the method will return to the initial speed monitoring step 110 via a standard ratio return step 124. If the vehicle speed is still below the first threshold, the method will further comprise comparing the vehicle speed to a second speed threshold in a speed threshold 2 comparison step 122. If the vehicle speed is greater than the second speed threshold, the method will return to the intermediate speed monitor step 118. If the vehicle speed is equal or below the second threshold, the method will ensure that all braking of the vehicle is executed by the friction braking system in a release non-friction braking step 126. Alternatively, the braking ramp schedule within the controller may ramp in such a way that when the vehicle reaches the second speed threshold, all negative torque is supplied by the friction brake system.

Figure 3:
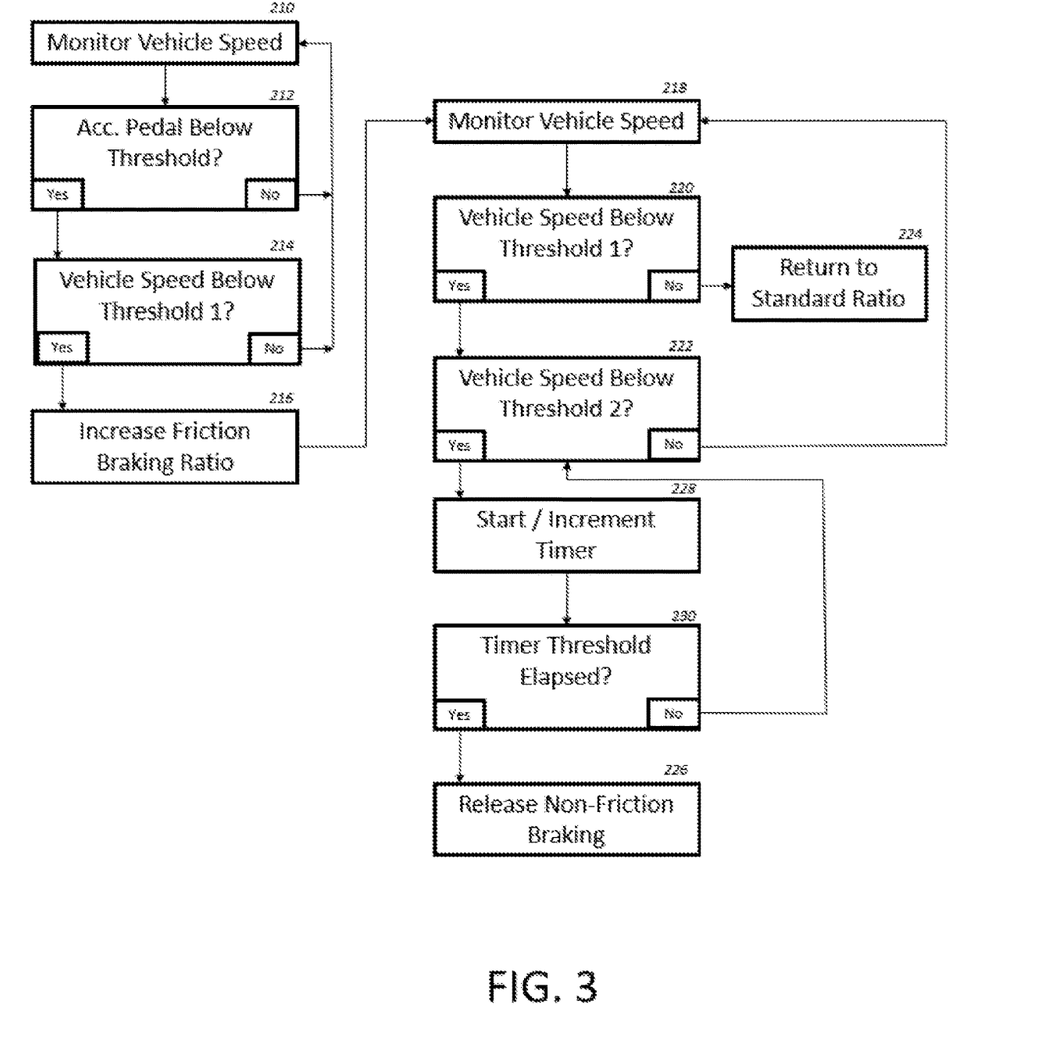
FIG. 3 illustrates a second braking execution algorithm.

With reference to FIG. 3, a second braking execution method 201 comprises a first initial speed monitoring step 210. The method further comprises monitoring for an accelerator pedal threshold 212. If an accelerator pedal reaches a predetermined pedal threshold, the method comprises a speed threshold 1 comparison step 214. In the speed threshold 1 comparison step 214, the controller compares the present speed of the vehicle to a first threshold speed. Upon both the request for negative torque and the vehicle speed being below a first threshold, the method comprises implementing an increased friction braking ratio strategy in an increase friction braking ratio step 216. In the increase friction braking ratio step 216, the controller may increase the ratio of friction braking in comparison to other sources of negative torque, such as regenerative braking and propulsion braking from electric machines. The ratio may vary as in accordance with a brake ramp schedule dependent upon the grade of the road and the weight of the vehicle store within the controller 44. The method further comprises an intermediate speed monitor step 218 for monitoring the vehicle speed. Next the method comprises comparing the vehicle's present speed to the first speed threshold in a second speed threshold 1 comparison step 220. If the vehicle speed is not below the first threshold, the method will return to the initial speed monitoring step 210 via a standard ratio return step 224. If the vehicle speed is still below the first threshold, the method will further comprise comparing the vehicle speed to a second speed threshold in a speed threshold 2 comparison step 222. If the vehicle speed is greater than the second speed threshold, the method will return to the intermediate speed monitor step 218. If the vehicle speed is equal or below the second threshold, the method will begin a timer in an increment timer step 228. Next, the method comprises comparing the timer with a temporal value in a timer comparison step 230. If the timer is below the temporal value, the method will return to the speed threshold 2 comparison step 222. If the vehicle is below or equal to the second speed threshold, the method will return to the increment timer step 228. If the timer has elapsed, or is equal to the temporal value, the method will ensure that all braking of the vehicle is executed by the friction braking system in a release non-friction braking step 226. Alternatively, the braking ramp schedule within the controller may ramp in such a way that when the vehicle reaches the second speed threshold, all negative torque is supplied by the friction brake system.

Figure 4:
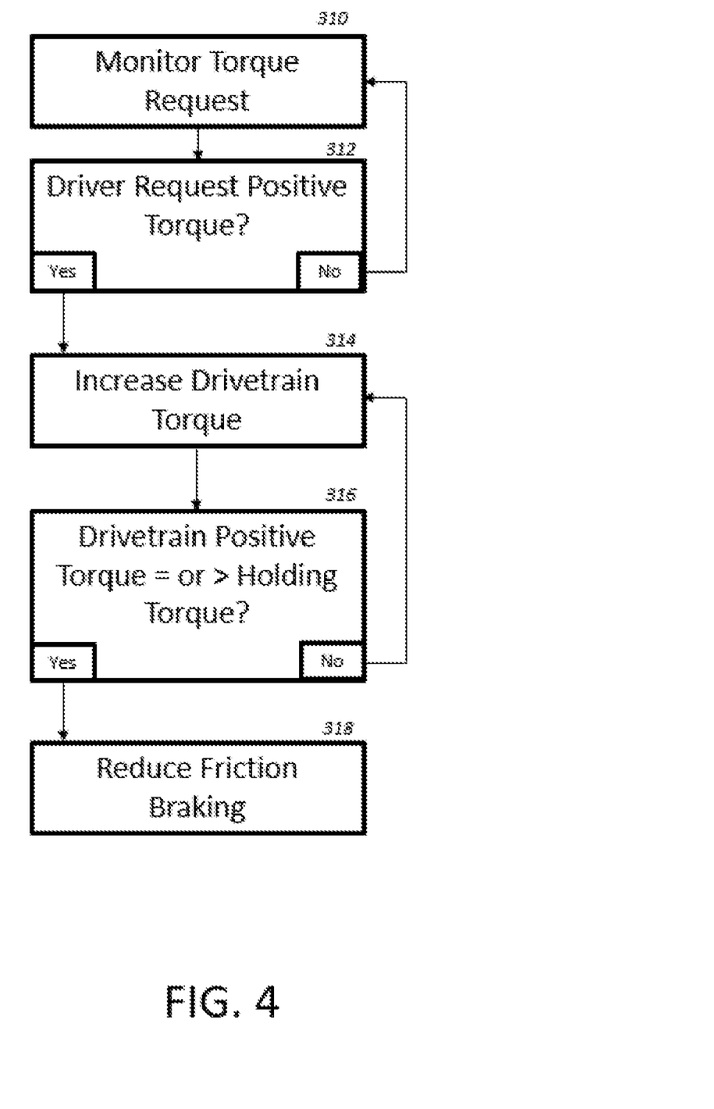
FIG. 4 illustrates a friction brake release algorithm.

With reference to FIG. 4, a friction brake release method 301 will monitor torque requests of the vehicle in an initial torque demand monitor step 310. Next, the method comprises querying the present torque request for positive torque requests in a positive torque demand comparison step 312. If there is not a positive demand for torque, the method will return to the initial torque demand monitor step 310. If there is a positive demand for torque, the method will increase drivetrain torque in an increase drivetrain torque step 314. Next the method will query if the drivetrain torque is equal to or greater than the friction braking torque in a positive torque to braking torque step 316. If the drivetrain torque is less than the braking torque, the method will return to the increase drivetrain torque step 314. If the drivetrain torque is equal to or greater than braking torque, the method will reduce the friction braking in a reduce friction braking step 318.

Figure 5:
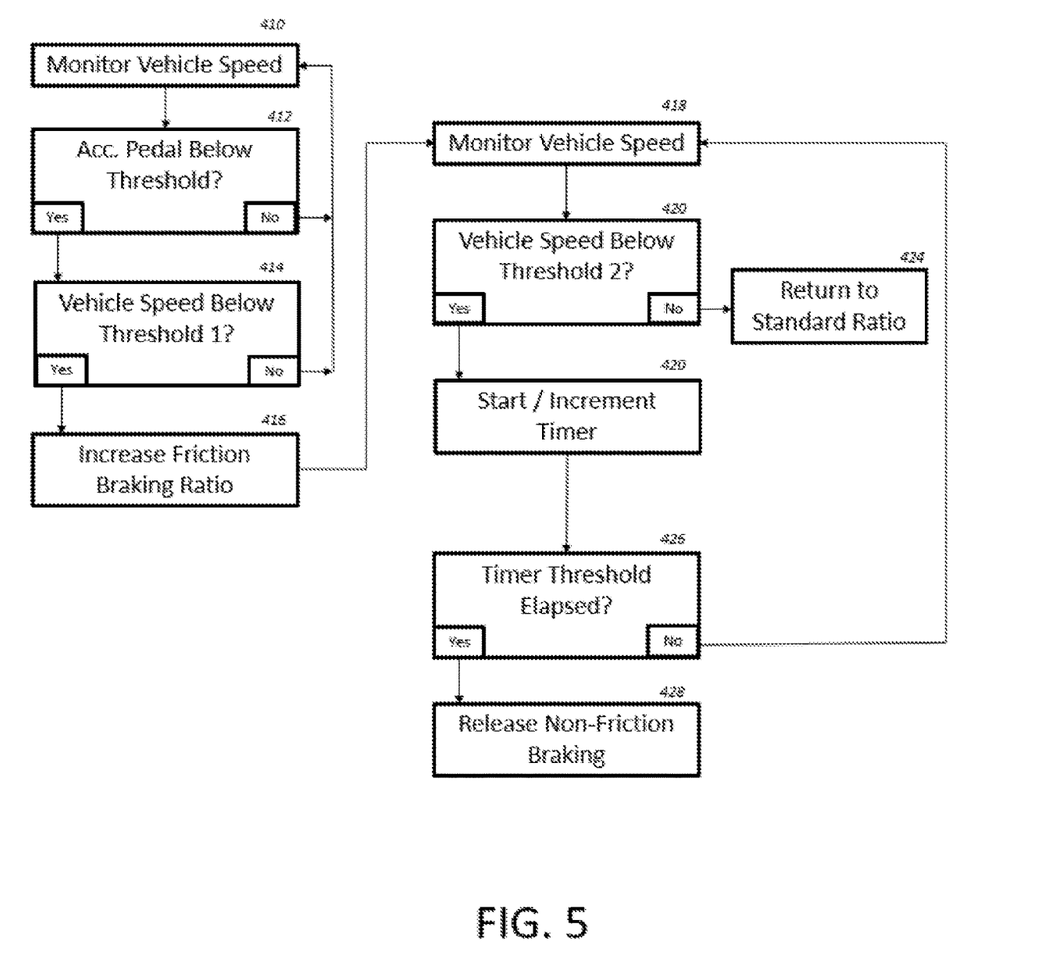
FIG. 5 illustrates a third braking execution algorithm.

With reference to FIG. 5, a third braking execution method 401 comprises a first initial speed monitoring step 410. The method further comprises monitoring for an accelerator pedal threshold 412. If an accelerator pedal reaches a predetermined pedal threshold, the method comprises a speed threshold 1 comparison step 414. In the speed threshold 1 comparison step 414, the controller compares the present speed of the vehicle to a first threshold speed. Upon both the request for negative torque and the vehicle speed being below a first threshold, the method comprises implementing an increased friction braking ratio strategy in an increase friction braking ratio step 416. In the increase friction braking ratio step 416, the controller may increase the ratio of friction braking in comparison to other sources of negative torque, such as regenerative braking and propulsion braking from electric machines. The ratio may vary as in accordance with a brake ramp schedule dependent upon the grade of the road and the weight of the vehicle store within the controller 44. The method further comprises an intermediate speed monitor step 418 for monitoring the vehicle speed. Next the method comprises comparing the vehicle's present speed to a second speed threshold in a speed threshold 2 comparison step 420. The second threshold may be greater than the first threshold. For example, the first speed threshold may be 0.5 kph, and the second speed threshold may be 1 kph. If the vehicle speed is not below the second threshold, the method will return to the initial speed monitoring step 410 via a standard ratio return step 424. If the vehicle speed is still below the second threshold, the method will further comprise starting or incrementing a timer in the timer step 420. Following this, the method will compare the timer in step 420 with a predetermined temporal value in step 426. If the timer equals or exceeds the predetermined temporal value of step 426, the controller will release all non-friction braking in step 428. If the timer does not equal or exceed the predetermined temporal value, the method will return to the intermediate monitor vehicle speed step 418.

Control logic or functions performed by one or more controllers may be represented by flow charts or similar diagrams in any of the various figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an electric machine;
   friction brakes; and
   a controller programmed to operate the electric machine to selectively regeneratively brake the vehicle based on driver accelerator pedal input, and responsive to a speed of the vehicle achieving or becoming less than a speed threshold, apply the friction brakes at a holding torque value in an absence of brake pedal input such that when the speed is zero, the friction brakes are active, wherein the speed threshold depends on road grade such that the speed threshold increases as the road grade increases.

2. The vehicle of claim 1, wherein the controller is further programmed to, responsive to the speed being zero, the friction brakes being active, and the driver accelerator pedal input being indicative of a request for forward movement, release the friction brakes after the electric machine produces a propulsion torque value at least equal to the holding torque value.

3. The vehicle of claim 1, wherein the controller is further programmed to, responsive to the speed being less than a first speed value, and greater than a second speed value, apply the friction brakes according to a brake ramp schedule.

4. The vehicle of claim 3, wherein the brake ramp schedule depends on the road grade or weight of the vehicle.

5. The vehicle of claim 1, wherein the speed threshold has a minimum value of zero.

6. The vehicle of claim 1, wherein the speed threshold further depends on a weight of the vehicle.

7. A method for controlling speed of a vehicle, the method comprising:
   in response to an input indicating one pedal drive mode being enabled, operating an electric machine to selectively brake the vehicle based on driver accelerator input, and in further response to the vehicle speed becoming less than a speed threshold during an absence of brake pedal input, applying a holding torque value via friction brakes, wherein the speed threshold depends on road grade such that the speed threshold increases as the road grade increases.

8. The method of claim 7 further comprising, responsive to the speed being zero, the friction brakes being active, and the driver accelerator pedal input being indicative of a request for forward movement, releasing the friction brakes after the electric machine produces a propulsion torque value at least equal to the holding torque value.

9. The method of claim 7 further comprising, responsive to the speed being less than a first speed value, and greater than a second threshold, applying the friction brakes according to a brake ramp schedule.

10. The method of claim 9, wherein the brake ramp schedule depends on the road grade or weight of the vehicle.

11. The method of claim 7, wherein the speed threshold has a minimum value of zero.

12. The method of claim 7, wherein the speed threshold further depends on a weight of the vehicle.

13. A vehicle comprising:
    an electric machine;
    friction brakes; and
    a controller programmed to, responsive to a speed of the vehicle becoming less than a speed threshold for at least a predefined period of time during an absence of brake pedal input, apply the friction brakes such that when the speed is zero, the friction brakes apply a holding torque value to maintain the speed at zero, wherein the speed threshold depends on road grade such that the speed threshold increases as the road grade increases.

14. The vehicle of claim 13, wherein the controller is further programmed to, responsive to the speed being zero, the friction brakes being active, and driver accelerator pedal input being indicative of a request for forward movement, release the friction brakes after the electric machine produces a propulsion holding torque value at least equal to the holding torque value.

15. The vehicle of claim 13, wherein the predefined period of time depends on road grade or weight of the vehicle.

16. The vehicle of claim 13, wherein the speed threshold has a minimum value of zero.

17. The vehicle of claim 13, wherein the speed threshold further depends on a weight of the vehicle.

* * * * *